United States Patent [19]
Rogers

[11] Patent Number: 5,671,802
[45] Date of Patent: Sep. 30, 1997

[54] ELECTRONIC CONTROL MODULE COOLING DEVICE

[75] Inventor: Daryl Jay Rogers, Linden, Mich.

[73] Assignee: General Motors Corporation, Detroit, Mich.

[21] Appl. No.: 539,575

[22] Filed: Oct. 5, 1995

[51] Int. Cl.⁶ .................................................. B60K 11/00
[52] U.S. Cl. ............... 165/41; 165/80.3; 123/198 E; 123/41.31; 180/68.1; 296/37.1; 454/159; 361/690
[58] Field of Search ............... 165/41, 80.3, 80.2; 123/198 E, 141; 180/68.1; 296/37.1; 454/159; 361/690

[56] References Cited

U.S. PATENT DOCUMENTS

| | | | |
|---|---|---|---|
| 4,065,170 | 12/1977 | Fabian et al. | 454/159 |
| 4,226,217 | 10/1980 | Haslbeck et al. | 123/198 E |
| 4,235,298 | 11/1980 | Sackett et al. | 123/198 E |
| 4,562,895 | 1/1986 | Kirchweger | 123/198 E |
| 4,610,326 | 9/1986 | Kirchweger et al. | 180/68.1 |
| 4,858,565 | 8/1989 | King | 123/41.31 |
| 5,113,819 | 5/1992 | Murakawa et al. | 123/198 E |
| 5,481,433 | 1/1996 | Carter | 165/80.2 |

FOREIGN PATENT DOCUMENTS

| | | | |
|---|---|---|---|
| 59-108818 | 4/1986 | Japan | 123/41.31 |
| 6-137146 | 5/1994 | Japan | 123/41.31 |

*Primary Examiner*—John K. Ford
*Attorney, Agent, or Firm*—Patrick M. Griffin

[57] ABSTRACT

An underhood mounting structure for a heat sensitive as well as heat producing electronic control module shields the module from underhood heat as well as cooling it with outside air. A double walled box contains and encloses the module, shielding and insulating it. An inlet hose introduces forced air from the front of the vehicle to the box, where it flows around and cools the contained module before exiting back to the outside.

2 Claims, 2 Drawing Sheets

ELECTRONIC CONTROL MODULE COOLING DEVICE

This invention relates to electronic control module cooling in general, and specifically to a device designed to both shield such a module from high underhood vehicle temperatures as well as to actively cool it.

BACKGROUND OF THE INVENTION

Two parallel trends in modern vehicle design have made it increasingly difficult to protect electronic control modules against progressive heat degradation in the underhood environments where they are found. First, the underhood space is growing increasingly hot as more and more components are housed beneath it. Exacerbating this problem is the fact that the space is becoming smaller, and thus more crowded, as low cowl forward design becomes more common. Other changes, such as moving the catalytic converter close to the engine, may raise the temperature in the future. Second, electronic control modules themselves are growing larger and hotter as computer controls are being added to perform more functions. A special problem is the powertrain control module, or PCM, which controls engine operation. It contains the central processing unit (CPU) as well as high heat producing power transistors, which must be as close to the CPU as possible to prevent the production of stray electromagnetic signals. Therefore, the PCM produces a good deal of heat internally, as well as needing protection from the heat in the underhood space where it is located. The current solution is to house the PCM in a heavy east aluminum casing to shield the unit, a casing that has a plurality of heaving heat dissipating fins. However, the need to protect the PCM for longer and longer warranty periods will necessitate more thorough cooling of the unit. The obvious solution of refrigeration or cooling with dedicated fans and the like is impractical due both to cost and lack of space. While it is known to home small electronic components in the air cleaner so that they are exposed to a forced air stream, there is not nearly enough room there for larger modules.

SUMMARY OF THE INVENTION

The invention provides an underhood mounting structure for the PCM that shields it from external heat as well as removing the heat that it produces internally. The structure includes a box that encloses and holds the PCM and also has provision for a cooling air flow integrated into it.

In the preferred embodiment disclosed, one side of the underhood space is defined by an inner fender liner, a panel that parallels the front fender, creating an empty space that rims from the from of the vehicle body to the front edge of the vehicle door. The invention includes a blow molded, double walled plastic box with a hinged lid and a flanged wall that is mounted to and through the fender liner, protruding partially into the space between the liner and the fender. The interior of the box is molded with upper and lower fibs. The PCM fits within the box, closely between the upper and lower fibs. When the lid is closed, the PCM is well shielded from underhood heat, as well as being securely mounted. An air inlet hose rims from a scoop located at the front of the vehicle to and through the flanged wall of the box, upstream of the divider ribs. An air outlet hose runs from a point downstream of, and above, the inlet hose, and out through the fender liner. When the vehicle has forward motion, the scoop picks up forced outside air, which runs into and through the box, washing above and below the PCM in a general U pattern created by the ribs, actively cooling the module. Heated air then exits through the outlet hose and ultimately returns to the outside through the seam between the fender and door. Even without significant vehicle forward motion, a convective air movement is established through the box by the relatively higher location of the exit hose in the box.

DESCRIPTION OF THE PREFERRED EMBODIMENT

These and other features of the invention will appear from the following written description, and from the drawings, in which.

Figure 1:
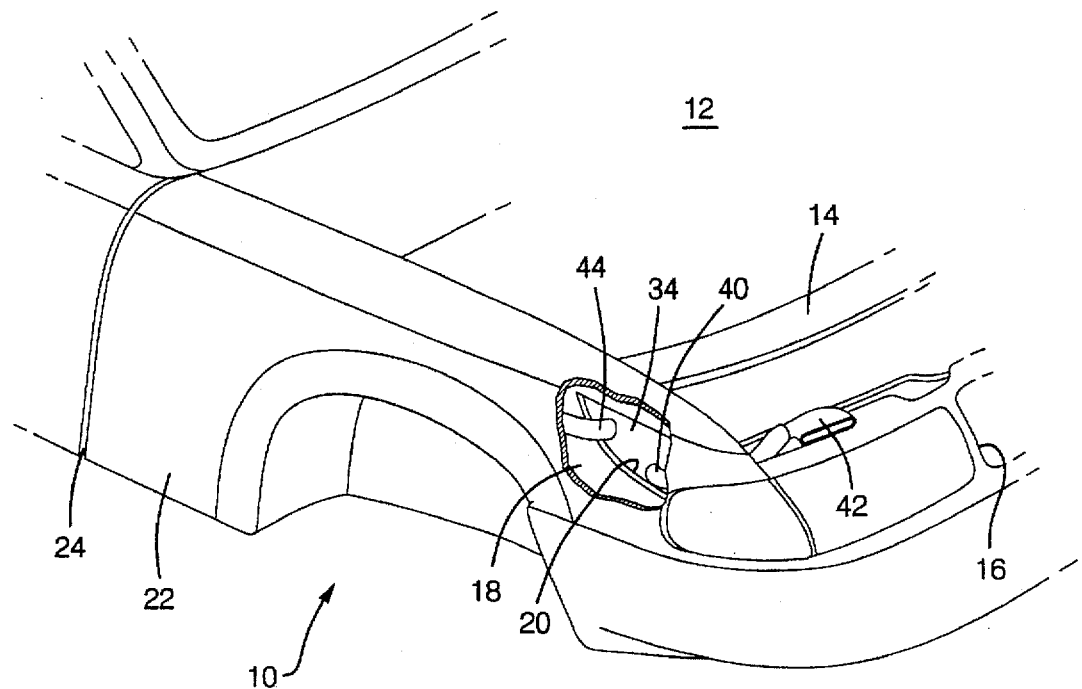
FIG. 1 is a perspective view of the front passenger side fender of a vehicle body partially broken away to reveal the inner fender liner and the air hoses.
Figure 2:
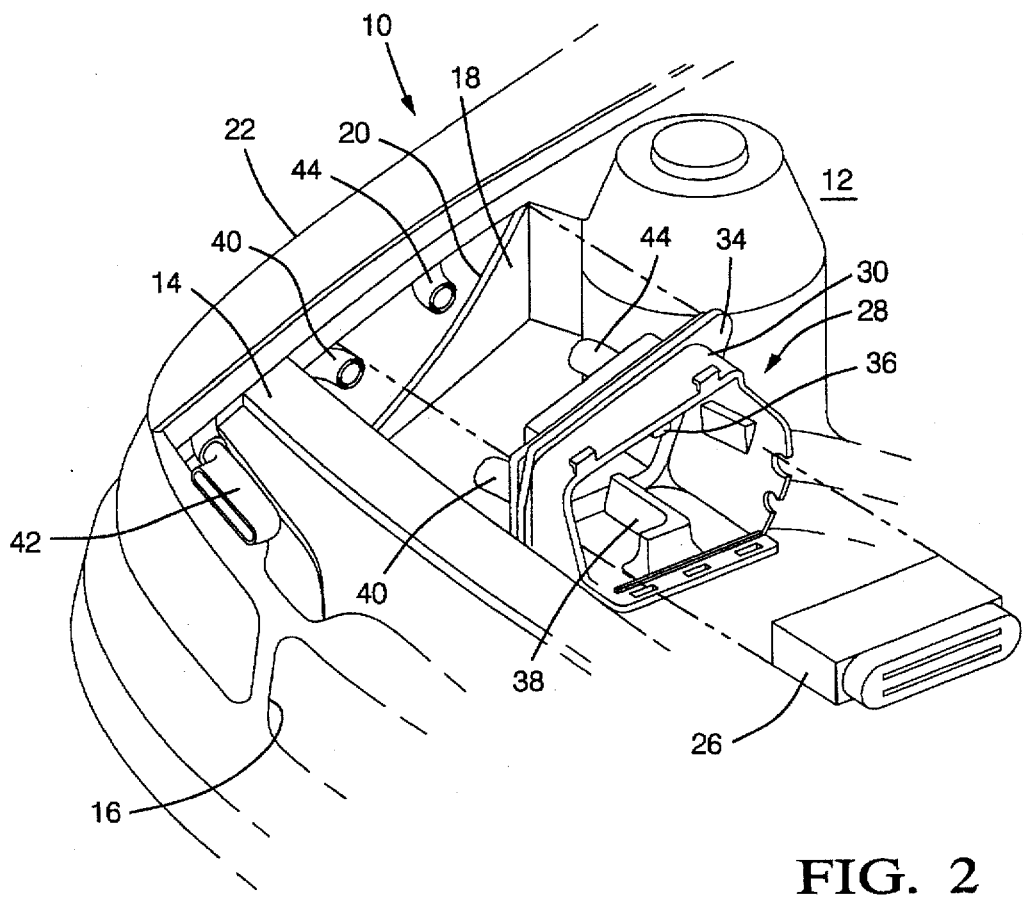
FIG. 2 is a perspective view of the underhood space and the box interior, without lid, removed from the fender liner, with the PCM shown removed from the box.

Referring first to FIGS. 1 and 2, a vehicle body, indicated generally at 10, includes an underhood space 12, the front of which is defined generally by an upper tie bar 14 and grill opening 16, and one side of which is defined by a fender liner 18. Just above tie bar 14, the edge of conventional hood, not illustrated, would rest with some clearance, through which clearance forced air would enter the underhood space 12. The primary source of forced air into space 12 is, of course, the grill opening 16. In the particular body 10 disclosed, the shape of the fender liner 18 and the way it is attached leaves a pre-existing, generally triangular hole 20 opening into the underhood space 12. The hole 20 also opens into a space between the fender liner 18 and the front fender 22, which extends as far as the crack or seam 24 between fender 22 and the front passenger side door. Some of the outside air that passes through grill opening 16 inevitably bypasses through the hole 20 and ultimately out the door seam 24. This air flow is strictly incidental, and has not been used to any particular purpose. In fact, if anything, it detracts from the cooling of the various components in the underhood space 12 that would otherwise occur if the air forced through grill opening 16 were better confined. Further, as noted, the temperatures within space 12 and the number of components located there are both on the increase. One of those components is the powertrain control module, or PCM, indicated at 26. PCM 26 is visible in the drawings only as the heavy, finned cast aluminum casing that surrounds it. As noted above, that casing has served both as a shield from the high heat in space 12, and as a heat to dissipate its internally produced heat to that space. Clearly, these are two rather countervailing purposes, since a heat sink can absorb as well as dissipate heat.

Figure 3:
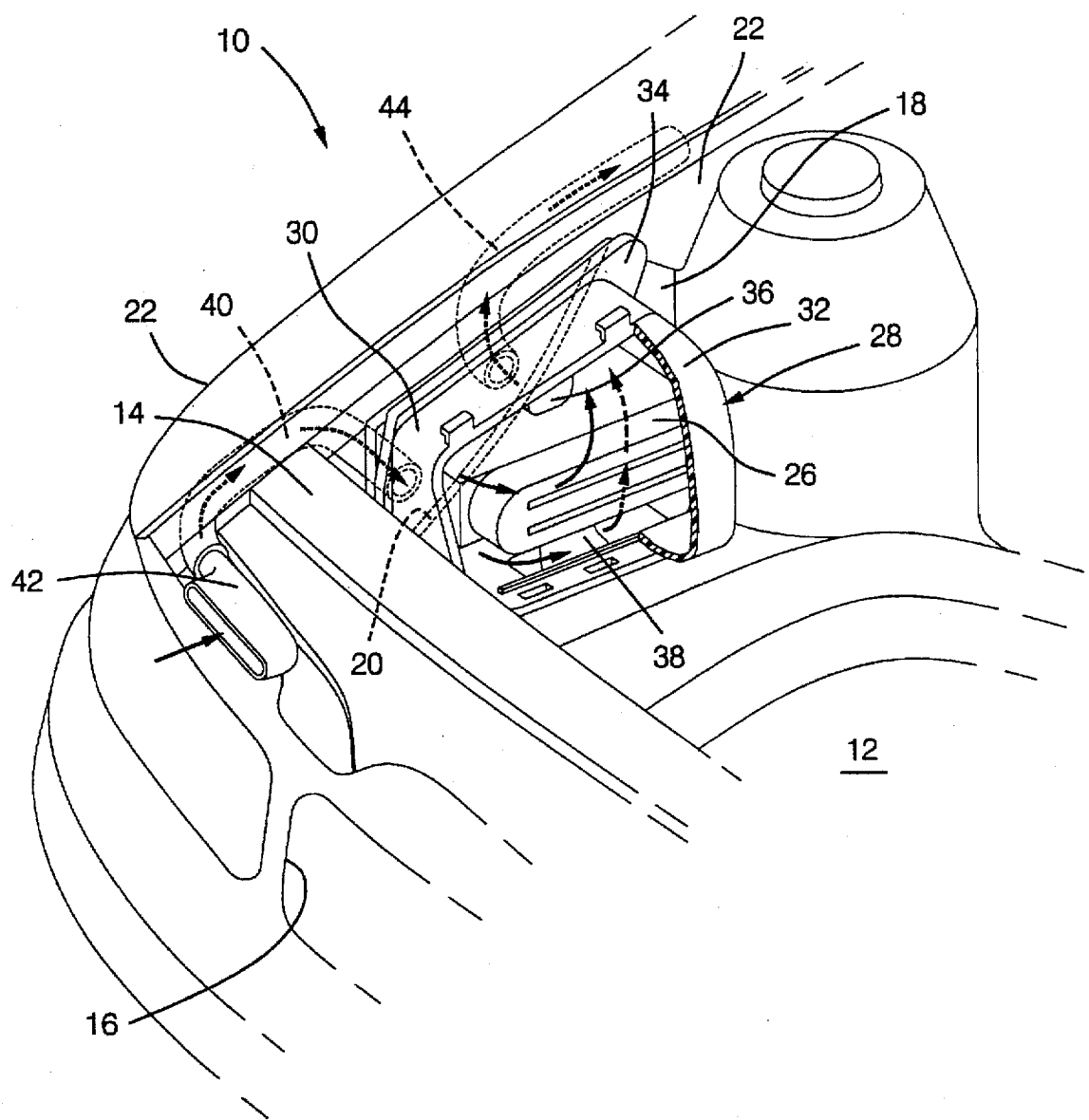
FIG. 3 is a perspective view like FIG. 2, but showing the PCM mounted, and showing the lid partially broken away to reveal the cooling air flow through the box.

Referring next to FIGS. 2 and 3, the invention, indicated generally at 28, comprises primarily a blow molded, double walled plastic box 30, closed by a removable hinged lid 32, which is only shown partially in FIG. 3. The outer side of box 30 is provided by a flanged wall 34 that protrudes closely through and seals the triangular hole 20 in liner 18, to which it can be joined with screws or other suitable fasteners. The interior of box 30 receives PCM 26 within snugly and substantially rattle free, once lid 32 has been closed, but with some surrounding clearance. Above and below PCM 26 clearance is provided by upper and lower internal ribs 36 and 38, molded integrally to box 30, which run substantially the entire width of box 30, and act as stand offs. Opening through the box flanged wall 34 at a relatively low height, and forward of the ribs 36 and 38, is a flexible air inlet hose 40. Inlet hose 40 extends outwardly from box wall 34, running between the fender liner 18 and fender 22, curving back inwardly to an elongated scoop 42. Scoop 42 is fixed to upper tie bar 14 so that its elongated mouth intersects, or is at least proximate to, the hood-tie bar 14 clearance referred to above. Also opening through box wall 34 at a higher point, and on the other side of the ribs 36 and 38, is a flexible air outlet hose 44. Outlet hose 44 also rims between the fender liner 18 and fender 22, and ends there, terminating short of the door seam 24. Outlet hose 44 begins and ends at a point higher than inlet hose 40, angling generally upwardly, and would be fixed to fender liner 18 by clamps or other suitable fasteners.

Referring next to FIG. 3, the operation of the invention is illustrated. As the vehicle engine runs, the underhood space 12 becomes heated. The shielding provided by the box 30 and lid 32 protects and shields the PCM 26, especially the double walled structure. However, as the engine runs, the internal heating in PCM 26 caused by its power transistors also raises its temperature, and its enclosure, without more, would actually worsen that effect. With forward vehicle motion, air is forced through the clearance between the hood and tie bar 14 and into scoop 42 and inlet hose 40. The forced outside air enters box 30 through wall 34, where it is forced by the ribs 36 and 38 into a generally U-shaped flow pattern, as shown by the arrows. The heated air flows above, below and around the PCM 26, eventually exiting through the outlet hose 44 and out between the fender liner 18 and fender 22. From there, the air returns to the outside through the door seam 24, an exit flow that is assisted by the air stream past door seam 24, which creates a suction. With no significant forward motion, the engine and PCM 26 are not producing as much heat. Still, the fact that the outlet hose 44 runs higher and angles upwardly creates a convective air flow through the hoses 40 and 44, enough to provide significant cooling in and of itself.

Variations in the embodiment disclosed could be made. Any enclosure provides shielding per se, and need not necessarily be blow molded or otherwise double walled, although such a construction does provide extra insulation and shielding. The size of the box 30 shown could, with a redesign of PCM 26, be smaller. That is, PCM 26 as disclosed has a heavy surrounding metal case which would not be necessary given the cooling and shielding provided by the invention. Without the metal casing around PCM 26, it is possible that the ribs 36 and 38 would not be needed, because the air flow could be arranged to more directly impact on the heat producing portions thereof, rather than bathing the entire casing, as disclosed. The box 30 could be mounted in any location in space 12 where there was room, although the mounting to fender liner 18 is most convenient because of its proximity to the space inboard of the fender 22 where the hoses 40 and 44 are run. Box 30 could be mounted by other means, but the flanged wall 34 is provided because of the pre existing hole 20 that it fills in the disclosed vehicle body 10. Incidentally, doing so helps confine the air flow through grill 16 to the underhood space 12, which helps reduce the temperature there. The hoses 40 and 44 could be directed otherwise, to other air entrance and air exit locations. However, the inlet hose 40 is most useful if it is located lower in order to create the convective cooling flow. It is also a great advantage to have the hoses 40 and 44 mounted where they are, since they thereby occupy only the otherwise empty and unused area between liner 18 and fender 22, and do not fill any of the already crowded underhood space 12. Therefore, it will be understood that it is not intended to limit the invention to just the embodiment disclosed.

I claim:

1. In a vehicle having a high temperature underhood space in which an electronic control module is located, said underhood being defined in part by a fender liner that is spaced from an outer fender, said structure, comprising, an enclosed box located within said underhood space and having one wall mounted to said fender liner, said module being enclosed and shielded within said box, an outside air inlet mounted to the front of said vehicle and running between said fender liner and fender so as to scoop in outside air as said vehicle moves and feed said outside air into said box, and, an air outlet directed oppositely to said air inlet and also running between said fender liner and fender so as to exhaust air from said box back to the outside, whereby said module is both shielded from said high temperature space as well as actively cooled by outside air, while said air inlet and outlet occupy volume located outside of said underhood space.

2. In a vehicle having a high temperature underhood space in which an electronic control module is located, a structure for both shielding and actively cooling said module, comprising, an enclosed box located within said space within which said module is contained so as to shield said module, said box having upper and lower divider ribs, an outside air inlet mounted to the front of said vehicle so as to scoop in outside air as said vehicle moves and feed said outside air into said box on one side of said divider ribs, and, an air outlet directed oppositely to said air inlet so as to exhaust air from said box on the opposite side of said divider ribs back to the outside, whereby said module is both shielded from said high temperature space as well as actively cooled by outside air entering said inlet which is directed in a substantially U shaped pattern around said module before exiting.

* * * * *

UNITED STATES PATENT AND TRADEMARK OFFICE
CERTIFICATE OF CORRECTION

PATENT NO. : 5,671,802
DATED : Sep. 30, 1997
INVENTOR(S) : Jim Y. Khoury, Daryl J. Rogers It is certified that error appears in the above-identified patent and that said Letters Patent is hereby corrected as shown below:

On the Title page: Item

(75) Inventor: should read as follows

--Inventors: Jim Y. Khoury, Macomb; Daryl J. Rogers, Linden, both of Mich.--

Signed and Sealed this

Twentieth Day of January, 1998

BRUCE LEHMAN

Attest:

Attesting Officer

Commissioner of Patents and Trademarks